(12) United States Patent
Carter et al.

(10) Patent No.: US 11,484,970 B2
(45) Date of Patent: Nov. 1, 2022

(54) ADDITIVE MANUFACTURING SYSTEM AND METHOD OF FORMING AN OBJECT IN A POWDER BED

(71) Applicant: General Electric Company, Schenectady, NY (US)

(72) Inventors: William Thomas Carter, Galway, NY (US); Justin John Gambone, Jr., Watervliet, NY (US); Lang Yuan, Niskayuna, NY (US); David Charles Bogdan, Jr., Charlton, NY (US); Marshall Gordon Jones, Scotia, NY (US)

(73) Assignee: General Electric Company, Schenectady, NY (US)

( * ) Notice: Subject to any disclaimer, the term of this patent is extended or adjusted under 35 U.S.C. 154(b) by 640 days.

(21) Appl. No.: 15/438,326

(22) Filed: Feb. 21, 2017

(65) Prior Publication Data
US 2018/0236603 A1 Aug. 23, 2018

(51) Int. Cl.
*B23K 26/142* (2014.01)
*B33Y 10/00* (2015.01)
(Continued)

(52) U.S. Cl.
CPC ............ *B23K 26/142* (2015.10); *B22F 12/00* (2021.01); *B23K 26/0604* (2013.01);
(Continued)

(58) Field of Classification Search
CPC .............. B23K 26/0604; B23K 26/342; B23K 26/142; B33Y 10/00; B33Y 30/00
(Continued)

(56) References Cited

U.S. PATENT DOCUMENTS 5,662,762 A * 9/1997 Ranalli ................ B08B 7/0042
156/707
6,204,475 B1 * 3/2001 Nakata ................ B23K 26/147
219/121.84
(Continued)

FOREIGN PATENT DOCUMENTS

CN 105413330 A 3/2016
EP 1016494 A2 7/2000
(Continued)

OTHER PUBLICATIONS

Machine translation of JP 11-314189 performed on Oct. 5, 2021.*
(Continued)

*Primary Examiner* — Joel M Attey
*Assistant Examiner* — Alba T Rosario-Aponte
(74) *Attorney, Agent, or Firm* — Dority & Manning, P.A.

(57) ABSTRACT

An additive manufacturing system including a housing configured to contain a powder bed of material, and an array of laser emitters having a field of view. The array is configured to melt at least a portion of the powder bed within the field of view as the array translates relative to the powder bed. The system further includes a spatter collection device including a diffuser configured to discharge a stream of gas across the powder bed, and a collector configured to receive the stream of gas and contaminants entrained in the stream of gas. The collector is spaced from the diffuser such that a collection zone is defined therebetween, and the spatter collection device is configured to translate relative to the powder bed such that the collection zone overlaps with the field of view of the array.

8 Claims, 2 Drawing Sheets

Figure 1:
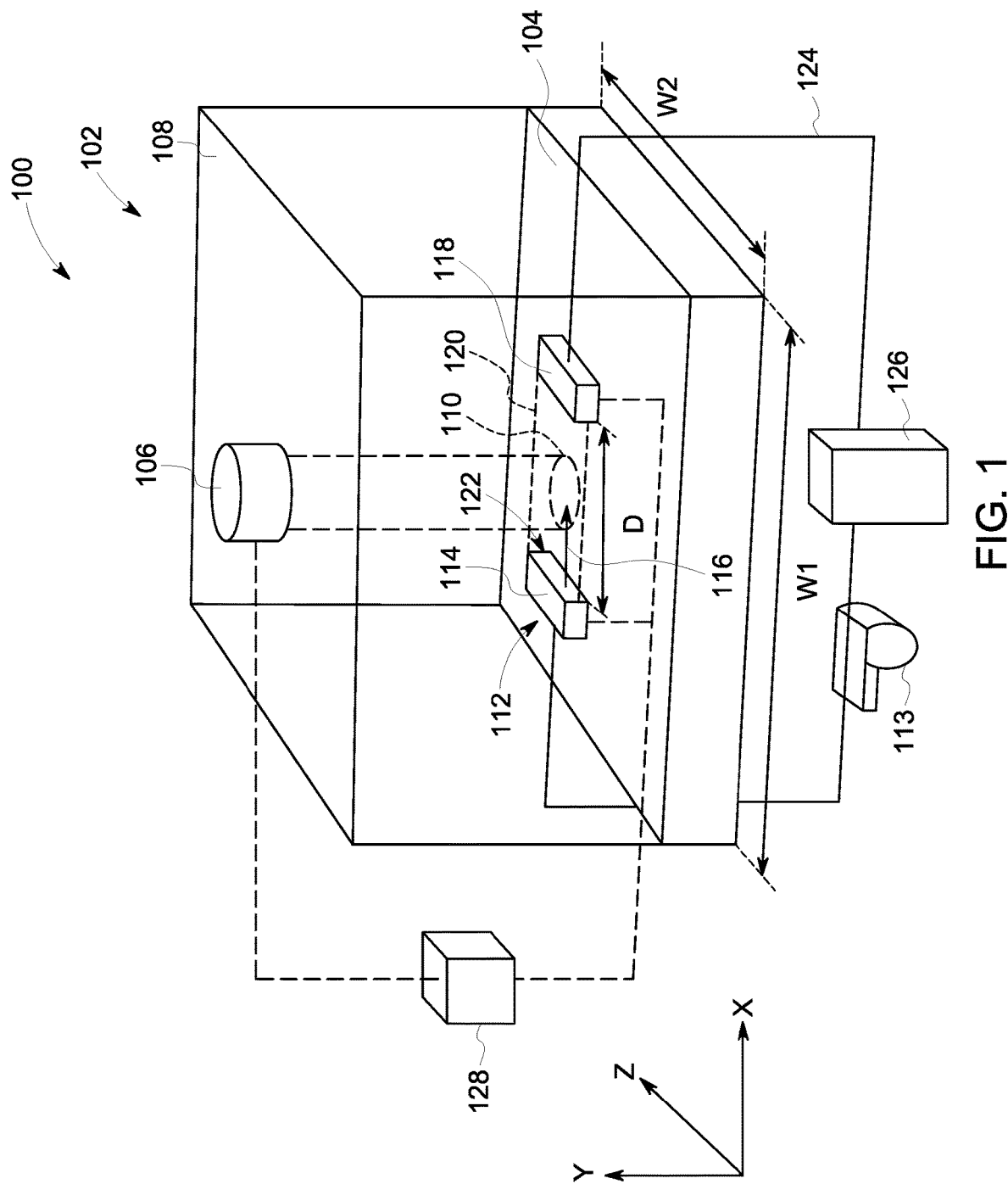

(51) Int. Cl.
  *B33Y 30/00* (2015.01)
  *B23K 26/342* (2014.01)
  *B29C 64/371* (2017.01)
  *B29C 64/153* (2017.01)
  *B23K 26/06* (2014.01)
  *B22F 12/00* (2021.01)
  *B22F 10/10* (2021.01)

(52) U.S. Cl.
  CPC .......... *B23K 26/342* (2015.10); *B29C 64/153* (2017.08); *B29C 64/371* (2017.08); *B33Y 10/00* (2014.12); *B33Y 30/00* (2014.12); *B22F 10/10* (2021.01); *B22F 2201/00* (2013.01); *B22F 2201/10* (2013.01); *B22F 2999/00* (2013.01); *Y02P 10/25* (2015.11)

(58) Field of Classification Search
  USPC .................................................... 219/0.76, 1
  See application file for complete search history.

(56) References Cited

U.S. PATENT DOCUMENTS

| | | | |
|---|---|---|---|
| 6,798,814 B2 | 9/2004 | Geiger et al. | |
| 8,866,040 B2 | 10/2014 | Ko et al. | |
| 9,592,636 B2 | 3/2017 | Araie et al. | |
| 10,335,901 B2 | 7/2019 | Ferrar et al. | |
| 10,399,145 B2 | 9/2019 | McMurtry et al. | |
| 2002/0153360 A1* | 10/2002 | Yamazaki | H01L 21/268 219/121.66 |
| 2012/0126457 A1 | 5/2012 | Abe et al. | |
| 2014/0198365 A1 | 7/2014 | Li et al. | |
| 2014/0238961 A1* | 8/2014 | Kato | B23K 26/389 219/121.7 |
| 2015/0125335 A1 | 5/2015 | Bruck et al. | |
| 2015/0165556 A1* | 6/2015 | Jones | B28B 1/001 264/482 |
| 2015/0246485 A1 | 9/2015 | Guenster et al. | |
| 2016/0121398 A1* | 5/2016 | Schlick | B22F 3/1055 425/11 |
| 2016/0136731 A1* | 5/2016 | Mcmurtry | B22F 3/1055 419/53 |
| 2016/0207077 A1* | 7/2016 | Farmer | G21F 9/005 |
| 2016/0214173 A1* | 7/2016 | Fisser | B22F 3/1007 |
| 2017/0014905 A1 | 1/2017 | Kawada et al. | |
| 2017/0021454 A1* | 1/2017 | Dallarosa | B33Y 10/00 |
| 2017/0072468 A1* | 3/2017 | Schilling | B23K 26/142 |

FOREIGN PATENT DOCUMENTS

| | | | |
|---|---|---|---|
| JP | 09267189 A | | 10/1997 |
| JP | 11314189 A | * | 11/1999 |
| JP | 2016-216773 A | | 12/2016 |
| KR | 20090030581 A | | 3/2009 |

OTHER PUBLICATIONS

International Search Report and Written Opinion issued in connection with corresponding PCT Application No. PCT/US2018/013380 dated Apr. 16, 2018; 14 pp.

Fernandes, Diandro Bailoni et al., "Test for measurement of spattering level and reach in MIG/MAG welding", Welding & Inspection, vol. 15, Issue 2, Apr.-Jun. 2010, retrieved from Google Translation at https://translate.google.com/translate?hl=en&sl=pt&u=http://www.scielo.br/scielo.php%3Fscript%3Dsci_arttext%26pid%3DS0104-92242010000200009&prev=search, last visited Jan. 19, 2017.

* cited by examiner

ADDITIVE MANUFACTURING SYSTEM AND METHOD OF FORMING AN OBJECT IN A POWDER BED

BACKGROUND

The present disclosure relates generally to additive manufacturing systems and, more specifically, to a system and method of collecting weld spatter and other contaminants during a build operation.

Additive manufacturing is a technology that enables "3D-printing" of components from various materials, such as metallic material. In additive manufacturing processes such as direct metal laser melting (DMLM), an object is built layer-by-layer by leveling a powder bed and selectively fusing predetermined portions of the powder bed using a high-powered laser. After each layer is fused, additional powder is leveled and the laser fuses the next layer, thereby fusing it to the prior layers to fabricate a complete object buried in the powder bed.

In at least some known additive manufacturing processes, weld spatter and smoke may result from fusing portions of the powder bed with the high-powered laser. Weld spatter appears as sparks that discharge from the powder bed, and is formed from molten metallic particles, for example. The weld spatter sometimes lands on the powder bed and becomes fused within the object, thereby forming potential metallurgical defects in the object. At least some known manufacturing systems include a gas diffuser positioned on one side of the powder bed and a gas collection plenum positioned on another side of the powder bed. The gas diffuser discharges inert gas across the powder bed, such that contaminants entrained in the inert gas are channeled towards, and collected by, the gas collection plenum. However, the gas supply velocity and pressure for the inert gas is limited to ensure the powder bed remains undisturbed when fusing layers of the object.

BRIEF DESCRIPTION

In one aspect, an additive manufacturing system is provided. The system includes a housing configured to contain a powder bed of material and an array of laser emitters having a field of view. The array is configured to melt at least a portion of the powder bed within the field of view as the array translates relative to the powder bed. The system further includes a spatter collection device including a diffuser configured to discharge a stream of gas across the powder bed, and a collector configured to receive the stream of gas and contaminants entrained in the stream of gas. The collector is spaced from the diffuser such that a collection zone is defined therebetween, and the spatter collection device is configured to translate relative to the powder bed such that the collection zone overlaps with the field of view of the array.

In another aspect, a method forming an object in a powder bed is provided. The method includes emitting a plurality laser beams towards the powder bed from an array of laser emitters having a field of view, translating the array of laser emitters relative the powder bed such that the plurality of laser beams melt at least a portion of the powder bed within the field of view as the array translates relative to the powder bed, and defining a collection zone spaced between a diffuser and a collector of a spatter collection device. The diffuser is configured to discharge a stream of gas across the powder bed, and the collector is configured to receive the stream of gas and contaminants entrained in the stream of gas. The method further includes translating the spatter collection device relative to the powder bed such that the collection zone overlaps with the field of view of the array.

DRAWINGS

Figure 2:
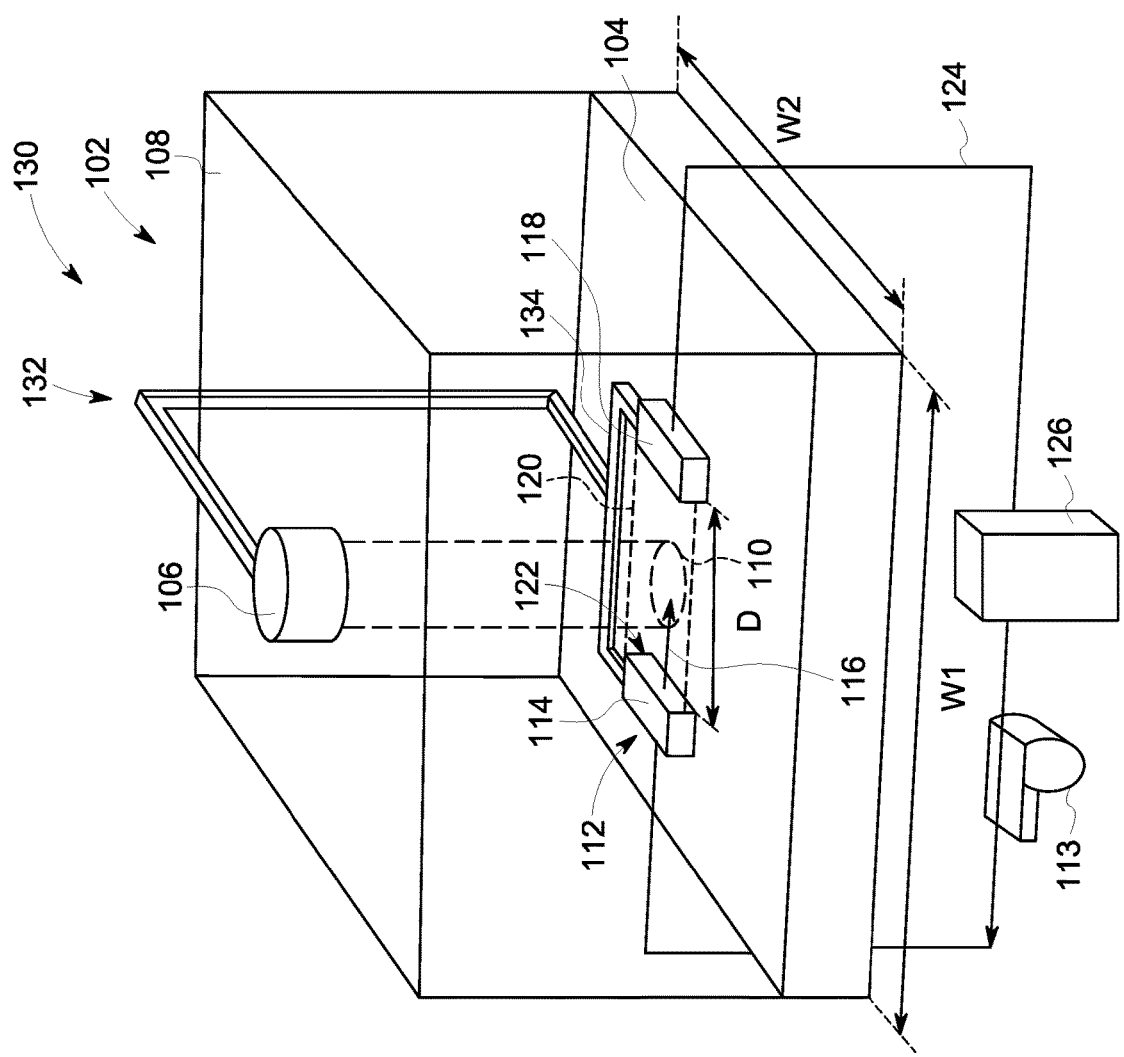

These and other features, aspects, and advantages of the present disclosure will become better understood when the following detailed description is read with reference to the accompanying drawings in which like characters represent like parts throughout the drawings, wherein:

FIG. 1 is a perspective illustration of an exemplary additive manufacturing system; and FIG. 2 is a perspective illustration of an alternative additive manufacturing system.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged. Such ranges are identified and include all the sub-ranges contained therein unless context or language indicates otherwise.

Embodiments of the present disclosure relate to a system and method of collecting weld spatter and other contaminants during a build operation. More specifically, the system includes an array of laser emitters that melts a portion of a powder bed, and a spatter collection device that facilitates the removal of contaminants from the system as the powder bed is melted. For example, the array includes of a field of view, and the spatter collection device includes a diffuser and collector spaced from each other such that a collection zone is defined therebetween. The field of view of the array and the collection zone both cover an area less than an area of the powder bed. As such, in operation, the array and the spatter collection device translate relative to the powder bed in a coordinated motion during a build operation. Moreover, translating the array and the spatter collection device in a coordinated motion enables a concentrated and precise stream of inert gas to be provided across the collection zone. As such, the system and method described herein facilitate the removal of contaminants, such as spatter particles and smoke particles, from the build operation in an efficient manner, thereby reducing the likelihood of manufacturing defects in a formed object.

FIG. 1 is a perspective illustration of an exemplary additive manufacturing system 100. In the exemplary embodiment, additive manufacturing system 100 includes a housing 102 that contains a powder bed 104 of material. Additive manufacturing system 100 further includes an array 106 of laser emitters that selectively melts at least a portion of powder bed 104 to form an object (not shown). In one embodiment, housing 102 includes a transparent top wall 108, and array 106 is positioned exterior of housing 102 and emits one or more laser beams (not shown) through transparent top wall 108 towards powder bed 104. In addition, exemplary powder bed material includes, but is not limited to, a metallic powder having a diameter defined within a range between about 10 microns and about 80 microns, and a polymeric material.

Each laser emitter (not shown) in array 106 selectively operates independent of each other during a build operation. For example, array 106 has a field of view 110 having an area less than an area of powder bed 104. As such, to form the object within powder bed 104, array 106 translates relative to powder bed 104 as laser emitters in array 106 melt at least a portion of powder bed 104 within field of view 110. Laser emitters in array 106 are selectively activated based on a build configuration of the object as array 106 translates relative to powder bed 104. As such, array 106 need only be positioned generally in a build position over powder bed 104, and each laser emitter in array 106 is oriented for melting a predetermined area within field of view 110. Put another way, each laser emitter in array 106 is fixedly oriented, and the combination of the predetermined areas for the plurality of laser emitters is equal to the area of field of view 110.

In the exemplary embodiment, laser emitters in array 106 are low power laser emitters having a power output of less than about 60 watts. As such, the formation of weld spatter and other contaminants is reduced when melting powder bed 104. However, reducing the power output of the laser emitters also reduces the build rate for additive manufacturing system 100. As such, array 106 includes a plurality of low power laser emitters such that the build rate of additive manufacturing system 100 is maintained relative to a system including a single laser emitter having a greater power output. In addition, reducing the power output of the laser emitters facilitates reducing the translation rate for array 106 relative to powder bed 104 to enhance melting of powder bed 104. In one embodiment, array 106 translates relative to powder bed 104 at a rate of less than about 0.1 meters/second.

Additive manufacturing system 100 further includes a spatter collection device 112 positioned within housing 102. Spatter collection device 112 includes a blower 113 and a diffuser 114 that work in conjunction to discharge a stream 116 of inert gas across powder bed 104, and a collector 118 that receives stream 116 of inert gas and contaminants (not shown) entrained in stream 116 of inert gas. Collector 118 is spaced from diffuser 114 such that a collection zone 120 is defined therebetween. Similar to field of view 110, collection zone 120 also has an area less than the area of powder bed 104. More specifically, diffuser 114 and collector 118 are spaced from each other by a distance D less than a first width W1 of powder bed 104, and diffuser 114 includes a discharge outlet 122 having a width W less than a second width W2 of powder bed 104. In addition, diffuser 114 is spaced from powder bed 104 at a height such that stream 116 of inert gas does not disturb powder bed 104.

Moreover, reducing the translation rate of array 106 enables spatter collection device 112 to be translated relative to powder bed 104 in a coordinated motion with array 106. More specifically, array 106 of laser emitters and spatter collection device 112 translate relative to powder bed 104 such that field of view 110 of array 106 and collection zone 120 traverse powder bed 104 in a coordinated motion, and such that collection zone 120 continuously overlaps with field of view 110 during a build operation. In addition, spatter collection device 112 is translated at a rate that substantially matches the translation rate of array 106. In one embodiment, array 106 of laser emitters and spatter collection device 112 translate relative to powder bed 104 along more than one axis, such as x-axis and y-axis (both shown in FIG. 1), based on the build parameters of the object. As such, a concentrated and precise stream 116 of inert gas is provided across collection zone 120.

In the exemplary embodiment, additive manufacturing system 100 further includes a conduit 124 coupled between collector 118 and diffuser 114, and a filter 126 coupled within conduit 124. Conduit 124 channels stream 116 of inert gas received at collector 118 for recirculation towards diffuser 114. In addition, filter 126 removes contaminants, such as spatter particles and smoke particles (both not shown), from stream 116 of inert gas before being recirculated towards diffuser 114. As such, at least a portion of stream 116 of inert gas provided across collection zone 120 is recycled. Alternatively, at least a portion of stream 116 is provided from an inert gas source (not shown).

In one embodiment, additive manufacturing system 100 includes a controller 128 that controls the coordinated motion and translation of array 106 of laser emitters and spatter collection device 112 relative to powder bed 104. For example, array 106 and spatter collection device 112 are translatable independent of each other with a translation mechanism (not shown), and controller 128 individually controls translation of array 106 and spatter collection device 112 to facilitate continuous overlap of field of view 110 and collection zone 120. Any translation mechanism is associated with array 106 and spatter collection device 112 that enables additive manufacturing system 100 to function as described herein. An example translation mechanism includes, but is not limited to, a track system.

FIG. 2 is a perspective illustration of an alternative additive manufacturing system 130. As described above, array 106 of laser emitters and spatter collection device 112 translate relative to powder bed 104 in a coordinated motion. In the exemplary embodiment, additive manufacturing system 130 includes a translating assembly 132 coupled to array 106 of laser emitters and spatter collection device 112. As such, array 106 and spatter collection device 112 are coupled to a common assembly, and translating assembly 132 is movable for defining the coordinated motion.

In one embodiment, translating assembly 132 includes a recoater arm 134 coupled to array 106 of laser emitters and spatter collection device 112. Recoater arm 134 is translatable across powder bed 104, and is actuated one of during or after a melt sequence is performed for each layer such that material is redistributed evenly across powder bed 104 for subsequent layering during a build operation. In the exemplary embodiment, when not redistributing material within powder bed 104, recoater arm 134 is translatable for defining the coordinated motion of array 106 and spatter collection device 112.

The system and method described herein facilitate the removal of contaminants from the housing of an additive manufacturing system formed during melting of material in a powder bed. Rather than providing generalized removal across an entire build area of the powder bed, a spatter collection device of the additive manufacturing system provides a concentrated and precise stream of inert gas for collecting contaminants formed during a build operation. The stream of inert gas is provided across an area less than an area of the powder bed, such that contaminants are collected in a manner that facilitates maintaining the integrity of the powder bed. Moreover, an array of laser emitters and the spatter collection device translate in a coordinated motion facilitate enhanced contaminant removal.

An exemplary technical effect of the system and method described herein includes at least one of: (a) removing contaminants from a build area in an additive manufacturing system; (b) enabling the use of increased powder bed areas in additive manufacturing build operations; and (c) reducing the likelihood of manufacturing defects in an object formed in an additive manufacturing process.

Exemplary embodiments of a system and method of forming an object in a powder bed. The system is not limited to the specific embodiments described herein, but rather, components of systems and/or steps of the methods may be utilized independently and separately from other components and/or steps described herein. For example, the configuration of components described herein may also be used in combination with other processes, and is not limited to practice with only metallic additive manufacturing systems and related methods as described herein. Rather, the exemplary embodiment can be implemented and utilized in connection with many applications where precise and efficient contaminant removal is desired.

Although specific features of various embodiments of the present disclosure may be shown in some drawings and not in others, this is for convenience only. In accordance with the principles of embodiments of the present disclosure, any feature of a drawing may be referenced and/or claimed in combination with any feature of any other drawing.

This written description uses examples to disclose the embodiments of the present disclosure, including the best mode, and also to enable any person skilled in the art to practice embodiments of the present disclosure, including making and using any devices or systems and performing any incorporated methods. The patentable scope of the embodiments described herein is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An additive manufacturing system comprising:
a housing configured to contain a powder bed of material;
an array of laser emitters having a field of view, said array configured to melt at least a portion of the powder bed within the field of view;
a spatter collection device comprising:
a diffuser configured to discharge a stream of inert gas across the powder bed, and
a collector configured to receive the stream of inert gas and contaminants entrained in the stream of inert gas, wherein said collector is spaced from said diffuser such that a collection zone is defined therebetween; and
an arm member comprising a first end and a second end, said first end of said arm member coupled to said array, and said second end of said arm member coupled to said diffuser and said collector, said arm member adapted to align the field of view with the collection zone such that moving said arm member moves said array, said diffuser, and said collector relative to the powder bed along more than one axis in a coordinated motion, wherein the spatter collection device is fixed with respect to the array via the arm member such that movement of the spatter collection device and the array is synchronized.

2. The system in accordance with claim 1, wherein each laser emitter in said array has a power output of less than 60 watts.

3. The system in accordance with claim 1, wherein said array is configured to translate relative to the powder bed at a rate of less than 0.1 meters/second.

4. The system in accordance with claim 1, wherein said diffuser and said collector are spaced from each other by a distance less than a width of the powder bed.

5. The system in accordance with claim 1, wherein said diffuser comprises a discharge outlet having a width less than a width of the powder bed.

6. The system in accordance with claim 1, further comprising a controller configured to control movement of said arm member relative to the powder bed.

7. The system in accordance with claim 1, wherein each laser emitter in said array is oriented for melting a predetermined area within the field of view.

8. The system in accordance with claim 1 further comprising:
a conduit coupled between said collector and said diffuser; and
a filter coupled within said conduit, said filter configured to remove the contaminants from the stream of inert gas before the stream of inert gas is recirculated towards said diffuser.

* * * * *